Dec. 13, 1966 H. A. FRANCIS 3,291,871

METHOD OF FORMING FINE WIRE GRIDS

Filed Nov. 13, 1962

INVENTOR.
Henry A. Francis

BY

Bernie G. Lynne
Attorney

United States Patent Office 3,291,871

Patented Dec. 13, 1966

3,291,871

METHOD OF FORMING FINE WIRE GRIDS

Henry A. Francis, Cambridge, Mass., assignor to Arthur D. Little, Inc., Cambridge, Mass., a corporation of Massachusetts Filed Nov. 13, 1962, Ser. No. 237,153
1 Claim. (Cl. 264—1)

This invention relates to an optical tool and more particularly to a method of making plane-parallel fine wire grids which can be used as diffraction gratings or as polarizers.

Gratings, whether made by cutting a series of fine slits, by ruling grooves on a substrate, or by aligning a number of thin wires to form screen-like grids have long been known as optical tools both in experimental and industrial applications. Among their uses may be listed polarizers and diffraction gratings.

Recently it has been proposed to form wire grid polarizers by making a replica of a ruled grating, and subsequently shadowing the replica to form a series of fine metallic wires along the ridges of the replica (see for example the Journal of the Optical Society of America, volume 50, 886–891). The shadowing technique to form plane-parallel wire grids in which very fine wires are placed extremely close together is used in a process described in a copending patent application Serial No. 210,-347, now Pat. No. 3,235,630, filed in the names of Paul E. Doherty, Henry H. Blau, Jr., and Richard S. Davis and assigned to the same assignee as the present application. Basically the process of the invention described in the above-identified application comprises the steps of electropolishing the surface of an aluminum crystal to form periodical corrugations made up of recurring valleys and peaks, forming a replica of this corrugated surface, and finally shadowing the peaks of the replica to form a gridwork comprising a series of very fine wires spaced about 400 A. apart.

The technique of shadowing to form fine wires is of course also applicable to any other corrugated surface formed of recurring valleys and peaks, whether these surfaces are a part of the master corrugated substrates or replicas of them. The process of the herein-described invention which employs shadowing as an initial step is therefore applicable to all forms of corrugated substrates, and is particularly advantageous in increasing the height of the wires in a very closely spaced fine wire grid without unduly increasing the width of the wires. The "height" of the wires, as the term is used hereinafter, refers to their dimension perpendicular to the plane of the grid and the "width" of the wires to their dimension in the plane of the grid perpendicular to their axis. The words "narrow" and "wide" will be used to refer to their width.

Although the following description of this invention will, for convenience, be presented in terms of forming a fine wire grid, the method described is also applicable to increasing the height of corrugation prior to forming a replica which in turn may be used in the construction of a grid or other application.

As will be apparent in the following discussion, shadowing more metal is not the solution to forming higher wires in a grid or to accentuating the corrugations prior to making a replica, since this technique is attended by an undesirable increasing of the width of the wires formed. It therefore becomes necessary to provide a process by which wire grids may be formed in which the wires making up the grid are relatively high without sacrificing the narrowness of their base widths.

It is therefore a primary object of this invention to provide a method whereby the height of the wires of a fine wire grid constructed by shadowing the peaks of a corrugated substrate may be materially increased without increasing the width of these wires. An additional object is to provide a method of increasing the height of the peaks of a corrugated substrate which is to be used in the formation of replicas. It is another object of this invention to provide improved fine wire grids, including highly efficient polarizers suitable for polarizing even visible or ultraviolet light. It is yet another object of this invention to provide improved optical tools which are characterized as being fine wire gratings of thin wires, the height of the wides being maximized while their width is not unduly increased. Other objects of the invention will in part be obvious and be apparent hereinafter.

The invention accordingly comprises several steps and the relationship of one or more such steps with respect to each of the others and the article possessing the features, properties and the relation of elements which are exemplified in the following detailed disclosure, and the scope of the invention will be indicated in the claim.

For a fuller understanding of the matter and objects of the invention will be indicated in the claim.
detailed description taken in connection with the accompanying drawings in which:

In the description which follows the term "corrugated substrate" is used to describe any substrate which has a surface formed of periodically recurring peaks and valleys, whether formed by means such as described in U.S. Serial No. 210,347, by ruling, or by any other means. The peaks may be rounded as in FIG. 1, or sharp as in FIG. 2; and the substrate may be the original master corrugated substrate, a replica of it, or a thin film replica of its surface. It is necessary that at least the surface of the corrugated substrate be electrically non-conducting. This means that the entire substrate may be formed of an electrically nonconductive material such as a plastic, or it may be an electrically conducting material having a thin layer of electrical insulation on its corrugated surface.

Figure 1:
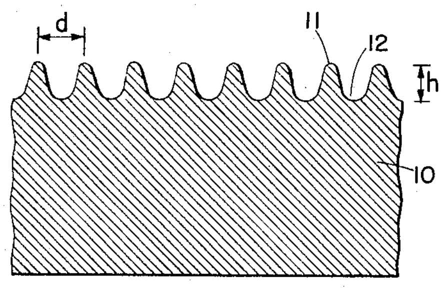
FIGS. 1–3 are cross-sectional views (much enlarged and not to scale) of two typical corrugated surfaces.
Figure 2:
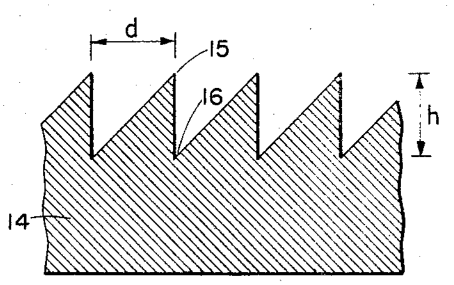

FIGS. 1 and 2 illustrate various types of corrugated substrates which may be used in the practice of this invention. FIG. 1 can be considered to represent a substrate or a replica prepared in accordance with the teaching of the above-identified application Serial No. 210,347. Since in the practice of that invention the substrate is formed by the electropolishing and subsequent, if desired, oxidation of the corrugated surface, the surface of the peaks and valleys will be of aluminum oxide. Hence it is unnecessary to subject the surface of such a corrugated substrate to any further treatment to make it electrically non-conducting. If the substrate of FIG. 1 is considered to represent a replica made by the practice described in the above-identified application and formed of a plastic material (for example, nitrocellulose) it also is unnecessary to further treat the replica since such a plastic material meets the requirement for being electrically non-conducting.

It will be seen in FIG. 1 that the substrate 10 has on its surface corrugations formed of periodically recurring peaks 11 and valleys 12. In a substrate prepared in accordance with the teaching of Serial No. 210,347, the height *h* which represents the difference in levels of the peaks and valleys is characteristically about 30 to 50 Angstroms; while the distance *d* between the peaks is about 300 to 500 Angstroms.

FIG. 2 shows a grating made by ruling and may be considered to be either an original substrate or a replica 14. In such substrates the height $h$ defined as the difference between peak 15 and valley 16, may be from about 0.5 mm. to 2100 Angstroms; while $d$ the spacing between peaks, may be as small as 4,600 Angstroms.

Figure 3:
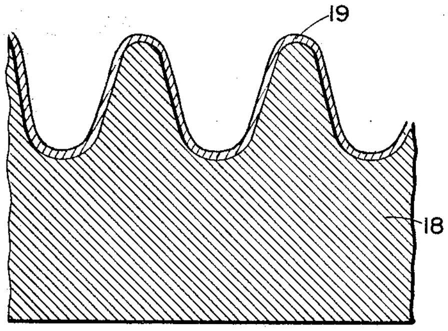

Finally FIG. 3 shows how a thin non-conducting layer 19 may be placed on a corrugated substrate 18 if the substrate or replica is formed of an electrically conducting material. Such an insulation may be deposited in any known manner, such as by vapor deposition, which is suitable for putting down a very thin layer without affecting the contour of the surface.

Figure 4:
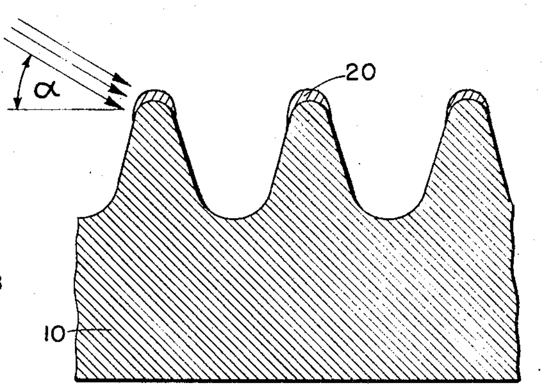
FIG. 4 illustrates the step of shadowing a replica made from such surfaces.

FIG. 4 illustrates the first step of the process of this invention. This constitutes shadowing the peaks of the corrugated substrate to form continuous fine metal wires. Shadowing is most conveniently done by placing the substrate in an evacuated atmosphere and depositing the metal wires on the peaks from the vapor phase. In doing this, it is necessary to direct the vapor at the substrate at a small angle $\alpha$. Ideally, what is desired is a narrow continuous wire of an electrically conducting material lying as nearly as possible on the top of each peak. The angle $\alpha$ of FIG. 4, which is that made between the horizontal plane of the peaks and the direction of the vapor, should be less than about 20°. Shadowing is continued only for the length of time required to build up a continuous wire of the metal 20. The width of the shadowed wire is typically about 100 to 200 Angstroms. If shadowing is carried out for an extended period of time the metal forming the wire will be deposited not only on the top of the peaks, but along the sides of the peaks and even into the valleys, at which point the wires run together. This can not be tolerated in the process of this invention.

Figure 5:
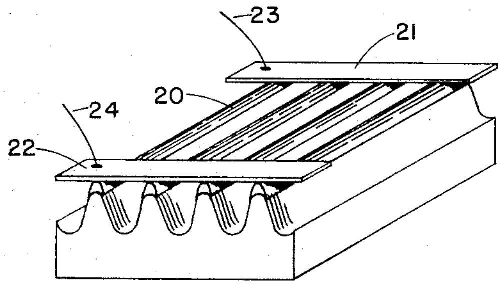
FIG. 5 is a perspective view illustrating the shadowed replica prior to electroplating.

The next step in the building up of the height of the peaks is that of electroplating metal on the electrically conducting metal wires formed by shadowing (FIG. 4). FIG. 5 is a perspective view of the shadowed surface in condition for the electroplating step. In order for the electron current to flow through the fine wires 20 deposited by shadowing, it is necessary to furnish suitable electrical connections to them. This is most conveniently done by depositing a thin layer of an electrically conducting metal (e.g. silver) to form connectors 21 and 22 along the two edges of the substrate perpendicular to the wires 20. These are then electrically joined to leads 23 and 24 prior to immersion in the electroplating baths.

In choosing the metals to be used in shadowing and in electroplating, consideration should be given to their physical and electrical properties. For example, it is preferable that the metals used in shadowing be metals which in the process of evaporation and vacuum deposition will give the narrowest continuous wires; preferably this metal will be platinum. In the process of electroplating, it is preferable that the metal used have a low resistivity. It is also of course preferable that it is one which is easily electroplated from a suitable solution. Among those metals which are suitable to build up the wire height by electroplating are silver, copper and gold.

The electroplating baths used in the step of building up the thin wires may be any suitable for depositing the metal used. However, it is preferable to use those baths which will achieve low throwing power. Since throwing power is a measure of the ability of an electroplating solution to produce coatings of uniform thickness on surfaces where the distances between various portions of the surface and the anode differ, it is desirable to minimize this parameter to increase the wire height without appreciably increasing the width of the wire. For example, in depositing copper a very pure acid bath has the lowest throwing power.

In keeping with standard electroplating techniques the electrically connecting members 21 and 22 (FIG. 5) are made the cathode and placed in an electrolyte which also contains an anode. The electrolyte is usually a solution of a salt of the metal to be deposited, and the anode is a strip of the metal to be deposited. Potentials of the order of one volt D.C. will normally be sufficient for the deposition. Also in keeping with known electroplating techniques it may be convenient to add other constituents to the electroplating bath to impart desired properties to the thickened wires. These additives are known in the art and are available to increase smoothness, brightness and continuity of deposition.

In addition to the use of a copper sulfate-sulfuric acid bath mentioned above, it is also possible to plate out copper using a Rochelle salt bath. A number of electrolytes are also known for plating gold, among which may be listed the gold chloride-hydrochloric acid and the potassium gold cyanide-potassium cyanide baths. For silver there are available several well-known cyanide electrolyte systems.

Electroplating is carried out until the desired additional height of the fine wires is obtained. Such a completed fine wire grid is illustrated in a fragmentary cross-sectional view in FIG. 6. It will be seen that the fines wires 25 have been built up on the original fine wires 20 by an additional height $h'$. It will be appreciated that the figures are not drawn to scale. The additional height $h'$ must be of sufficient magnitude to insure that the wires are opaque to radiation perpendicular to the plant of the grid. The total height $h''$ of the resulting wires may be about 500 Angstroms.

It is possible to build up the additional height $h'$ on the original fine wires making up the grid without appreciably increasing their width for at least two reasons. The first is that the negative charge in the electroplating process will tend to congregate at the tips or the point of the conductor, i.e., in this case the top of the wires. For this reason metal will tend to deposit more heavily on the top of the wires rather than on their sides.

The second reason for the fact that the fine wires will grow in height to a greater extent than in width is that the diffusion of metal ions through the electrolyte to the sides of the wires and bottoms of the valleys is hindered by the narrowness (less than 300 Angstroms) of the passage between the wires. Thus more metal will be deposited on the top of the wires than on their sides.

The advantages of being able to build up extremely high narrow wires in a grid of this nature are readily apparent. The polarizing ability of the grid increases as the axial resistance (hence the cross-sectional area) of the wires decreases. The transmittance (intensity ratio of transmitted radiation to incident radiation) increases as the wire width decreases and also as the space between the wires increases. Hence, for any given substrate, the polarizing ability and transmittance are maximized with maximum wire height and minimum wire width.

Figure 6:
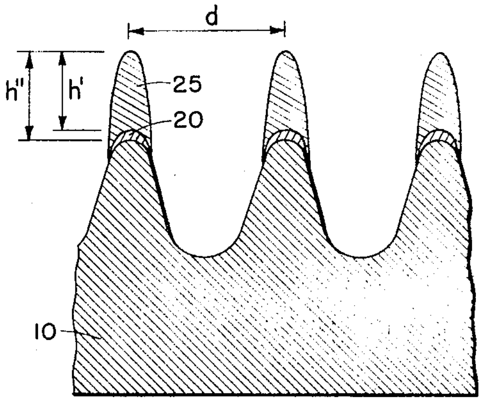
FIG. 6 illustrates a fragmentary portion of the finished grating in cross-section.

The substrate illustrated in FIG. 6 may, as noted above, also be used as a master substrate from which replicas may be made. Thus it is possible to make replicas in which the height of the corrugation peaks is materially increased. Such replicas may then in turn be shadowed to form wire grids. In shadowing such replicas the shadowing material may be deposited on the peaks without covering the sides or extending into the valleys.

The substrate which results from the practice of the herein described method can be described as having a corrugated surface formed of periodically recurring peaks and valleys, the tops of the peaks having continuous fine wires lying along and affixed to them. The height of these wires may be characterized as being substantially greater than their width. These substrates may be used as opitical tools or may serve as master substrates for making replicas.

It will thus be seen that the objects set forth above, among those made apparent from the preceding description, are efficiently attained, and, since certain changes may be made in carrying out the above method and in the composition set forth without departing from the scope of the invention, it is intended that all matter contained in the above description shall be interpreted as illustrative and not in a limiting sense.

I claim:

Method of forming fine wire grid, comprising the steps of (a) shadowing the tops of the peaks of a corrugated substrate, at least the surface of which is electrically non-conducting, to form along said tops fine wires of an electrically conducting material;

(b) electroplating a metal on said fine wires thereby to increase their height without appreciably increasing their width and to form a master substrate;

(c) forming a replica of said master substrate; and (d) shadowing the peaks of said replica.

References Cited by the Examiner

UNITED STATES PATENTS

| | | | |
|---|---|---|---|
| 2,232,551 | 2/1941 | Merton | 264—220 |
| 3,073,759 | 1/1963 | Wiant | 204—15 |
| 3,235,630 | 2/1966 | Doherty et al. | 264—220 X |

ROBERT F. WHITE, *Primary Examiner.*

ALEXANDER H. BRODMERKEL, *Examiner.*

B. SNYDER, *Assistant Examiner.*